United States Patent Office 3,776,983
Patented Dec. 4, 1973

3,776,983
BLOCK POLYMERS DERIVED FROM VINYL QUATERNARY NITROGEN MONOMERS AND POLYALKYLENE OXIDE CONDENSATES
Carmine P. Iovine and Dilip K. Ray-Chaudhuri, Somerset, N.J., assignors to National Starch and Chemical Corporation, New York, N.Y.
No Drawing. Filed June 10, 1971, Ser. No. 151,985
Int. Cl. C08f 29/46; C08g 33/14
U.S. Cl. 260—901                                7 Claims

ABSTRACT OF THE DISCLOSURE

Novel block copolymers of the A-B or A-B-A type are described wherein the A block is derived from a vinyl quaternary nitrogen monomer and the B block is derived from a polyalkylene oxide condensate. The novel copolymers are water-soluble or water-dispersible and are useful as electroconductive coatings in the manufacture of electrophotoconductive paper.

BACKGROUND OF THE INVENTION

This invention relates to the synthesis of novel water-soluble or water-dispersible polymeric compositions and to the use of these polymers as electroconductive coatings. More particularly it relates to the synthesis of novel water-soluble or water-dispersible block copolymers incorporating blocks derived from polyalkylene oxides and from vinyl quaternary nitrogen monomers.

In electrophotographic processes using photoconductive elements comprising a conductive paper support coated with a photoconductive layer, proper functioning of the photosensitive layer depends on the rapid dissipation of static electric charges by the conductive support. Untreated paper does not function as a suitable support because under conditions of low ambient relative humidity the water content in the sheet is very low and the paper behaves as an electrical insulator. Accordingly, the paper used as a support for electrophotographic elements is usually treated with chemicals to make it suitably conductive. The chemicals used for this treatment are hydrophilic so as to provide the required water holding capability and are also capable of supplying ions to promote the electrical conductivity of the treated paper. Polyelectrolytes, especially cationic polyquaternary ammonium polymers have been found to be very useful for treating paper to make it electroconductive.

To this end, base paper has been treated with a mixture of a humectant, usually a polyalkylene oxide, and a deliquescent salt to make it conductive. Such treatment affords good conductivity at moderate relative humidity, but fails at low relative humidity where the polyalkylene oxide humectants are not much more effective than the cellulose itself in holding water.

Polycationic electrolytes provide a non-migratory source of ions and have good conductivity even at low relative humidity. The principal disadvantages of these treating chemicals are their relatively high cost and the characteristic tackiness of the polymer films.

We have found block copolymer compositions comprising polyquaternary ammonium salts and poly(alkylene oxides) perform excellently as conductive treating chemicals. Moreover, the polyquaternary salts are unexpectedly more effective in providing good conductive properties to the paper, even at low relative humidity, when combined chemically in the block copolymers of this invention than when used in physical mixtures with poly(alkylene oxides). As a result of this synergistic enhancement of conductivity, less of the quaternary salt is required in the polymer to give satisfactory conductive properties to the paper than when physical mixtures are used. This circumstance makes the use of the copolymers of this invention economically attractive.

SUMMARY OF THE INVENTION

Accordingly, it is an object of this invention to provide novel water-soluble or water-dispersible block copolymers. A further object is to provide such block copolymers which are useful as electroconductive coatings for paper.

The novel block copolymers of this invention are comprised of poly(alkylene oxide) chains and poly(vinyl oxide) chains and poly(vinyl quaternary ammonium salt) chains linked by sulfur atoms. The block copolymers fall broadly into two classes, those of the A-B type and those of the A-B-A type. In both of these types the B chain is a poly(alkylene oxide) having a molecular weight from about 100 to about 6000 with at least one of the terminal group capped by a radical containing a terminal sulfur atom. The A chain is the vinyl portion of the block copolymer and consists of repeating units of vinyl polymerizable monomers at least some of which carry quaternary ammonium groups. Both water-soluble and water-insoluble comonomers may be included in the A chains of the block copolymer provided they do not exceed about 50%, by weight, of the total vinyl portion.

In general, the block copolymers of this invention are conveniently synthesized as follows: a prepolymer is prepared by esterifying the terminal hydroxyl groups of a poly(alkylene oxide) condensate with a low molecular weight mercapto carboxylic acid to produce a mercapto-capped poly(alkylene oxide); thereafter, the mercapto-capped poly(alkylene oxide) is reacted with the vinyl ammonium monomer in the presence of a radical polymerization initiator to yield the block copolymer.

DESCRIPTION OF THE PREFERRED EMBODIMENTS

In general, the poly(alkylene oxide) portion of the block copolymer corresponds to the following formula

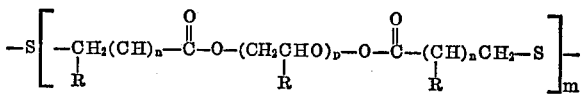

where $R = H$ or $CH_3$
$n = 0$ or $1$,
$p =$ an integer from 1–500,
$m =$ an integer from 1–50.

Segments of this formula are derived from prepolymers made by esterifying the terminal hydroxyl groups of a poly(alkylene oxide) condensate with a low molecular weight aliphatic mercaptoalkanoic acid. This esterification may be carried out by any conventional esterification reaction, for example, by heating the poly(alkylene oxide) with the mercapto acid in the presence of concentrated sulfuric acid. Such segments may also be made by copolymerizing hydrogen sulfide and a poly(alkylene oxide) diacrylate as shown in Erickson U.S. Pat. 3,278,352, issued Oct. 1, 1966. Another poly(alkylene oxide) suitable for use as the B portion of the block copolymer has the formula

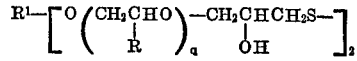

where $R^1 = C_1-C_6$ alkylene
$R = H$ or $CH_3$
$q =$ an integer from 1–100.

Other types of polyethylene oxides useful in the compositions of this invention are those of formula

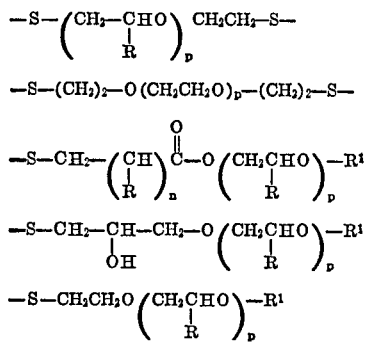

where the letters have the meanings defined above. Block copolymers of ethylene oxide and propylene oxide capped with sulfhydryl groups are also suitable for use as the B portion of the block copolymers of this invention. Other sulfhydryl-capped poly(alkylene oxide) chains are useful for the B component of the block copolymers of this invention and will be evident to those skilled in the art.

The vinyl portion of the block copolymer which makes up the A portion of the molecule is composed of repeating units of a vinyl quaternary ammonium salt monomer. Any quaternary ammonium salt containing a vinyl group capable of undergoing addition polymerization may be used in building up this portion of the polymer. Representative compounds include those of the class represented by the formula

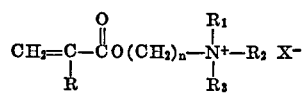

where R is —H or —$CH_3$, $n$=an integer from 2–6, and $R_1$, $R_2$, and $R_3$ are radicals such as $C_1$–$C_6$ alkyl radical, 2-hydroxyethyl, 2-hydroxypropyl, a carboxamidomethyl radical, a carbalkoxymethyl radical, or 4-chloro-2-butenyl, and X may be $Cl^-$, $Br^-$, $OSO_3CH_3^-$ or $CH_3CO_2^-$. $R_1$, $R_2$ and $R_3$ may be the same or different. A typical compound of this class is methacryloxyethyltrimethylammonium chloride. Another class of useful vinyl ammonium compounds is represented by the general formula

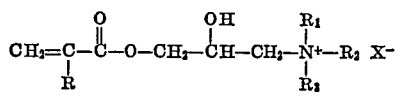

where the letters have the meanings defined above. A typical compound of this class is methacryloxy-2-hydroxypropyltrimethylammonium chloride. Another class of useful vinyl ammonium compounds is represented by the formula

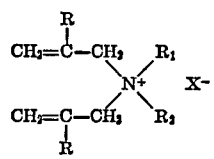

where the letters have the meanings defined above. A typical compound of this class is diallyldimethylammonium chloride. Another useful class of vinyl ammonium compounds is represented by the formula

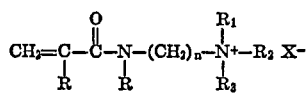

where the letters have the meanings defined above. A typical compound of this class is 3-methacrylamidopropyltrimethylammonium chloride. Typical further useful compounds include p-vinylbenzyltrimethylammonium chloride and methyl-4-vinylpyridinium chloride.

Other vinyl ammonium compounds can be used to impart special properties to the polymer. Such alternate compounds will be evident to those skilled in the art. It is also possible to use vinyl quaternary phosphonium or sulfonium compounds in place of the ammonium compounds described above.

Water-soluble comonomers such as acrylamide, methacrylamide, hydroxyethyl acrylate and methacrylate, hydroxypropyl acrylate and methacrylate, N-vinyl pyrrolidone, acrylic and methacrylic acids, sodium vinyl sulfonate, N-vinyl pyridine, and the like can be incorporated in amounts up to 50 percent, by weight, of the vinyl polymer portion of the block copolymer if desired. Water-insoluble comonomers such as alkyl acrylates and vinyl acetate can also be included in the vinyl portion of the block copolymer provided that the amount of water-insoluble monomer does not exceed about 50 percent, by weight, of the vinyl polymer composition.

As previously noted, the block copolymers of this invention are prepared by polymerizing a vinyl quaternary ammonium monomer (and vinyl comonomer if any is used) in the presence of the sulfhydryl capped polyether prepolymer. The polymerization is initiated by conventional free radical initiators such as t-butyl hydroperoxide or ammonium persulfate and is usually carried out in aqueous solution. In the usual method of preparation, the sulfhydryl capped prepolymer and the vinyl monomer or monomers are dissolved in water, a free radical polymerization initiator is added, and the mixture is heated for 3 to 8 hours until polymerization is complete, as indicated by no further increase in the viscosity of the reaction mixture. At the end of the polymerization the reaction mixture consists of the block copolymer in aqueous solution. The polymer may be applied to a paper base by coating from an aqueous solution of about 40% solids obtained directly by diluting the reaction mixture. However, if it is desired to recover the pure polymer for any reason, as for instance to determine its physical properties, it may be precipitated from the aqueous reaction mixture by adding a less polar solvent such as acetone and recovered by filtration.

Some of the sulfhydryl capped prepolymers used in preparing the block copolymers of this invention are available commercially (for example, the DION DPM-1002 polymercaptan resin sold by Diamond Alkali Corporation); others can be conveniently prepared as noted previously be esterifying the terminal alcohol groups of a polyalkylene glycol with a low molecular weight mercapto alkanoic acid.

The type of prepolymer used determines the type of block copolymer which is obtained. If the prepolymer has sulfhydryl groups at both ends of the poly(alkylene oxide) chain the block copolymer will be of the A-B-A type. If the prepolymer has a sulfhydryl group at one end only, the block copolymer will be of the A-B type. In each case, it should be noted, the principal type of copolymer will predominate in the reaction product, but other types of block copolymers not of the A-B-A or A-B types will also be formed. These types are not excluded from the scope of the invention and can be anticipated by a practitioner skilled in the art. Furthermore, these other polymers are also effective for electrically conductive coating of paper.

The electrically conductive polymers of this invention may be applied to the surface of a paper support by conventional techniques. A particularly convenient method of application is by means of a wirewound bar.

In the following examples the polymers were characterized by precipitation into isopropanol and/or acetone, filtering, washing, vacuum drying, and determining their properties. Ionic chloride was determined by a modified Volhard procedure using the precipitated polymer. Intrinsic viscosities were determined in a Cannon-Fenske viscometer using solutions of the precipitated polymers in 1 N potassium chloride solutions.

The following examples will illustrate the practice of this invention but are not intended to limit its scope. In the examples all parts are by weight unless otherwise specified.

Example I

This example shows the preparation of a sulfhydryl terminated polyether prepolymer.

A one liter, four neck, flask fitted with a glass stirrer, subsurface nitrogen inlet tube, Dean-Stark moisture trap, condenser with drying tube, and a heating mantle was charged with 315 parts of a polyethylene glycol having an average molecular weight of 6000 and a hydroxyl number of 18.4. To this was added 10.6 parts of β-mercaptopropionic acid, 39 parts of benzene, and 1.6 parts of concentrated sulfuric acid. The mixture was heated at 140–150° C. for 4½ hours, during which time 2.5 milliliters of water were collected in the moisture trap and the acid number of the reaction mixture dropped to 5.3. All the benzene was then removed by distillation at atmospheric pressure and the polymer melt was evacuated to a pressure of 12 millimeters of mercury at 140–150° C. and held at that temperature for 15 minutes. The final product was a white solid melting at 60–63° C. and having an acid number of 4.61.

Example II

This example shows the preparation and testing of a block copolymer of diallyldimethylammonium chloride and a poly(ethylene oxide) dimercaptan.

A three liter, four neck flask, equipped with a mechanical stirrer, thermometer, reflux condenser, and equalizing dropping funnel was charged with 791 parts of diallyldimethylammonium chloride, 656 parts of distilled water, 198 parts of the polyether dimercaptan of Example I, and 5.6 parts of t-butyl hydroperoxide (70% aqueous solution). After all components were dissolved, the system was vacuum deoxygenated with nitrogen and a nitrogen purge was maintained. The mixture was heated to 45° C. and a solution of 4 parts of sodium formaldehyde sulfoxylate in 200 parts of water was added from the dropping funnel at the rate of 2.5 parts per minute. After five minutes the temperature of the reaction mixture reached 65° C. and that temperature was maintained by periodic cooling. After all the sodium formaldehyde sulfoxylate solution had been added, the temperature of the reaction mixture was maintained at 65° C. for an additional four hours by external heating. The resultant viscous polymer solution was then diluted to a concentration of 40% solids by adding 628 parts of water. The polymer was precipitated by adding acetone, filtered, washed with acetone, and dried. The polymer obtained had an intrinsic viscosity (Cannon-Fenske) of 0.31 in 1 N aqueous potassium chloride solution, and a chloride content of 16.8%.

The block copolymer was coated from the 40% solids solution with a Meyer wire wound bar on a smooth, dense, nonporous paper base at a coating weight of 2 lbs. per ream. Samples measuring 2½" x 3" were cut and placed on a blotter. A wooden tongue depressor blade ¾" wide was placed centered lengthwise on the sample to cover an area 3" x ¾". A suspension of conductive silver paste in xylene was then sprayed on the sample. The tongue depressor blade was then removed leaving a sample having an area of electroconductive coating between two electrodes. The samples were then conditioned by storage at various relative humidities before their conductivities were measured. To determine its conductivity a conditioned sample was placed on an acrylic polymer plate. Two 50 g. brass weights, supported by a plastic holder maintaining a separation of ⅞" between the weights, served as electrodes for the conductivity measurement. The electrode assembly was placed on the sample so that one of the brass weights contacted each of the conductive silver paste electrodes of the sample. The resistance of the 3" x ¾" strip was measured with an electrometer (Keithley Model 620) and the resistivity of the coating was determined by dividing the resistance of the strip by four.

The measured resistivity of the coating of this example at 15% relative humidity was $2.9 \times 10^{10}$ ohms/square.

Example III

This example shows the preparation of a block copolymer of methacryloxyethyltrimethyl ammonium chloride and a poly(ethylene oxide) bis(mercaptopropionate).

A poly(ethylene oxide) bis(mercaptopropionate) was prepared by the procedure of Example I using a polyethylene glycol having an average molecular weight of 4000 in place of the polyethylene glycol of that example. A 100 ml. three neck round bottom flask equipped with a mechanical stirrer, a reflux condenser, and a thermometer was charged with 7.5 parts of this polymer and 17.7 parts of water. When the polymer had dissolved, 30 parts of methacryloxyethyltrimethylammonium chloride, 20 parts of water, and 0.06 parts of ammonium persulfate were added. The solution was purged with nitrogen and heated to 65° C. This temperature was maintained for 5½ hours. The polymer was precipitated by adding acetone, filtered, washed with acetone, and dried. The precipitated polymer was a white hygroscopic powder having an intrinsic viscosity of 0.42 in 1 N potassium chloride solution and a chlorine content of 12.5%.

When this polymer was coated and tested as in Example II the surface resistivity at 2 lbs./ream coating weight and 15% relative humidity was $5.4 \times 10^9$ ohms/square.

Example IV

This example shows the preparation of a prepolymer comprised of a poly(ethylene oxide)-poly(propylene oxide) block copolymer bis(mercaptopropionate).

The apparatus and procedure of Example I were used with an initial charge of 230 parts of a 30-40-30 mole percent block copolymer of ethylene oxide (30 mole percent segment) and propylene oxide (40 mole percent segment) having a molecular weight of 4380, 106 parts of beta-mercaptopropionic acid, 1.2 parts of concentrated sulfuric acid, and 50 parts of benzene to prepare a dimercapto terminated prepolymer. The mixture was heated at 145° C. for 5 hours during which time 7.5 ml. of water were collected and the acid number of the mixture dropped from 25 to 4.2. The mixture was then evacuated to a pressure of 12 mm. of mercury for 15 minutes. The dry product was a white solid melting at 28–30° C. and having an acid number of 2.7.

Example V

This example shows the preparation of a block copolymer of acrylamide, diallyldimethylammonium chloride, and the dimercaptan of Example IV.

A 250 ml. four neck round bottom flask fitted with a condenser, mechanical stirrer, equalizing addition funnel, and a thermometer was charged with 10 parts of the prepolymer prepared in Example IV, 37.5 parts of diallyldimethylammonium chloride, 2.5 parts of acrylamide, and 25 parts of water. The reaction mixture was purged with nitrogen and 0.15 part of t-butyl hydroperoxide (70% aqueous solution) was added. The mixture was heated to 40° C. and 10 parts of a 10% aqueous solution of sodium formaldehyde sulfoxylate were added at the rate of 10 ml. per hour. The temperature of the reaction mixture rose to 65° C. The temperature was held at 65° C. for 4 hours after the addition was complete. The polymer was obtained as a viscous water white solution and thereafter precipitated as in Example III. The precipitated polymer had an intrinsic viscosity of 0.46 in 1 N potassium chloride solution.

Example VI

This example shows the preparation of a block copolymer of a polymercaptan resin and diallyldimethylammonium chloride.

A 100 ml. three neck round bottom flask fitted with a stirrer, condenser, slow addition funnel, thermometer, and nitrogen inlet tube was charged with 20 parts of a 69% aqueous solution of diallyldimethylammonium chloride, 5 parts of a polymercaptan resin of the formula

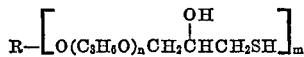

where R is an aliphatic hydrocarbon radical, equals 20–25, and $m$ equals 2–3, and 0.14 part of t-butyl hydroperoxide (70% aqueous solution). The addition funnel was charged with 5 parts of a 2% aqueous sodium formaldehyde sulfoxylate solution. The system was purged with nitrogen gas and the sodium formaldehyde sulfoxylate solution was added slowly over a 1 hour period. The temperature of the reaction mixture rose to 50° C., during the addition, and the viscosity increased. After the addition was complete, the mixture was heated at 60–65° C. for 5 hours during which the viscosity continued to increase.

Example VII

This example shows the preparation of a block copolymer of a polyethylene glycol bismercaptopropionate of molecular weight about 1000 and methacryloxyethyltrimethylammonium chloride.

A polyethylene glycol bismercaptopropionate prepolymer was prepared from a polyethylene glycol of molecular weight about 1000 and mercaptopropionic acid using the procedure described in Example I. The apparatus and procedure of Example III were used to prepare a copolymer starting from a charge of 20.8 parts of methacryloxyethyltrimethylammonium chloride, 8.8 parts of the polyethylene glycol bismercaptopropionate, 0.06 part of α,α'-azobisisobutyramidine dihydrochloride, and 30 parts water. The polymerization was carried out for 6 hours at a temperature of 65° C. The polymer obtained had an intrinsic viscosity of 0.19 in 1 N potassium chloride solution and a chloride content of 12.5%.

Example VIII

This example shows the preparation of another copolymer of a polyethylene glycol bismercaptopropionate and methacryloxyethyltrimethylammonium chloride.

The apparatus and procedure of Example III were used to prepare a copolymer starting from a charge of 30 parts of methacryloxyethyltrimethylammonium chloride, 5.7 parts of the polyethylene glycol bis(mercaptopropionate) of Example VII, 0.07 part of ammonium persulfate, and 35 parts of water. The polymerization was carried out at a temperatureof 65° C. for 6 hours. The polymer obtained had an intrinsic viscosity of 0.22 in 1 N potassium chloride solution and a chloride content of 12.85%.

Example IX

This example shows the preparation of another copolymer of a polyethylene glycol bis(mercaptopropionate) with methacryloxyethyltrimethylammonium chloride.

The apparatus and procedure of Example III were used to prepare a copolymer starting with a charge of 20 parts of the prepolymer of Example III, 30 parts of methacryloxyethyltrimethylammonium chloride, 0.07 part of ammonium persulfate, and 50 parts of water. The polymerization was carried out at a temperature of 65° C. for 6 hours. The polymerization obtained has an intrinsic viscosity of 0.29 in 1 N potassium chloride solution and a chloride content of 12.80%.

Example X

This example shows the preparation of another copolymer of a polyethylene glycol bis(mercaptopropionate) with methacryloxyethyltrimethylammonium chloride.

The apparatus and procedure of Example III were used to prepare a copolymer starting with a charge of 22.5 parts of the prepolymer of Example III, 15 parts of methacryloxyethyltrimethylammonium chloride, 0.03 part of ammonium persulfate, and 37.5 parts of water. The polymerization was carried out at a temperature of 65° C. for 6 hours. The polymer obtained had an intrinsic viscosity of 0.11 in 1 N potassium chloride solution and a chloride content of 10.80%.

Example XI

This example shows the preparation of a block copolymer of a polyethylene glycol bis(mercaptopropionate) and diallyldimethylammonium chloride.

The apparatus and procedure of Example II were used to prepare a block copolymer starting with a charge of 20.4 parts of the prepolymer of Example VII, 30 parts of diallyldimethylammonium chloride, 0.6 part of t-butyl hydroperoxide (70% aqueous solution), 33.6 parts of water and 0.45 part of sodium formaldehyde sulfoxylate. The polymerization was carried out at a temperature of 60° C. for 4 hours. The polymer obtained had an intrinsic viscosity of 0.17 in 1 N potassium chloride solution, and a chloride content of 14.6%.

Example XII

This example shows the preparation of a block copolymer of another polyethylene glycol bis(mercaptopropionate) and methacryloxyethyltrimethylammonium chloride.

The apparatus and procedure of Example II were used to prepare a block copolymer starting with a charge of 7.5 parts of the prepolymer of Example III, 30 parts of methacryloxyethyltrimethylammonium chloride, 0.6 part of t-butyl hydroperoxide (70% aqueous solution), 25 parts of water, and 0.45 part of sodium formaldehyde sulfoxylate. The polymerization was carried out at a temperature of 60° C. for 5¼ hours. The polymer obtained had an intrinsic viscosity of 0.20 in 1 N potassium chloride solution, and a chloride content of 10.5%.

Example XIII

This example shows the preparation of a block copolymer of another polyethylene glycol bis(mercaptopropionate) and diallyldimethylammonium chloride.

The apparatus and procedure of Example II were used to prepare a block copolymer starting with a charge of 12.5 parts of the prepolymer of Example I, 20 parts of diallyldimethylammonium chloride, 0.4 part of t-butyl hydroperoxide (70% aqueous solution), 31.7 parts of water, and 0.3 parts of sodium formaldehyde sulfoxylate. The polymerization was carried out at a temperature of 65° C. for 5 hours. The polymer obtained had an intrinsic viscosity of 0.21 in 1 N potassium chloride solution and a chloride content of 9.4%.

Example XIV

This example shows the preparation of a block copolymer of a polyethylene glycol bis(mercaptopropionate) and diallyldimethylammonium chloride.

The apparatus and procedure of Example II were used to prepare a block copolymer starting with a charge of 22.5 parts of the prepolymer of Example I, 15 parts of diallyldimethylammonium chloride, 0.3 part of t-butyl hydroperoxide (70% aqueous solution), 35 parts of water and 0.23 part of sodium formaldehyde sulfoxylate. The polymerization was carried out at a temperature of 65° C. for 5 hours. The polymer obtained had an intrinsic viscosity of 0.19 in 1 N potassium chloride solution and a chloride content of a 6.6%.

Example XV

This example shows the preparation of another block copolymer of a polyethylene glycol bis(mercaptopropionate) and diallyldimethylammonium chloride.

The apparatus and procedure of Example II were used to prepare a block copolymer starting from a charge of 7.5 parts of the prepolymer of Example III, 30 parts of diallyldimethylammonium chloride, 0.2 part of t-butyl hydroperoxide (70% aqueous solution), 25 parts of water, and 0.15 part of sodium formaldehyde sulfoxylate. The polymerization was carried out at a temperature of 65° C. for 4 hours. The polymer obtained had an intrinsic viscosity of 0.22 in 1 N potassium chloride solution and a chloride content of 12.1%.

Example XVI

This example shows the preparation of another block copolymer of a polyethylene glycol bis(mercaptopropionate) and diallyldimethylammonium chloride.

The apparatus and procedure of Example II were used to prepare a block copolymer starting with a charge of 10 parts of the prepolymer of Example VII, 40 parts of diallyldimethylammonium chloride, 0.1 part of t-butyl hydroperoxide (70% aqueous solution), 25 parts of water, and 0.08 part of sodium formaldehyde sulfoxylate. The polymerization was carried out at a temperature of 65° C. for 4 hours. The polymer obtained had an intrinsic viscosity of 0.09 in 1 N potassium chloride solution and a chloride content of 11.7%.

Example XVII

This example shows the preparation of a block copolymer of a polyethylene glycol bis(mercaptopropionate) and methacryloxy(2-hydroxy)propyltrimethylammonium chloride.

The apparatus and procedure of Example III were used to prepare a block copolymer starting with a charge of 5 parts of the prepolymer of Example III, 20 parts of methacryloxy(2-hydroxy)propyltrimethylammonium chloride, 0.04 part of ammonium persulfate, and 25 parts of water. The polymerization was carried out at a temperature of 65° C. for 6 hours. The polymer obtained had an intrinsic viscosity of 0.39 in 1 N potassium chloride solution and a chloride content of 11.2%.

Example XVIII

This example shows the preparation of a block copolymer of a polyethylene glycol bis(mercaptopropionate) and p-vinylbenzyltrimethylammonium chloride.

The apparatus and procedure of Example III were used to prepare a block copolymer starting with a charge of 2.5 parts of the prepolymer of Example I, 10 parts of p-vinylbenzyltrimethylammonium chloride, 0.01 part of ammonium persulfate, and 5 parts of water. The polymerization was carried out at a temperature of 65° C. for 6 hours. The polymer obtained had an intrinsic viscosity of 0.12 in 1 N potassium chloride solution and a chloride content of 9.6%.

Example XIX

This example shows the preparation of a block copolymer of a polyethylene glycol bis(mercaptopropionate) with diallyldimethylammonium chloride and acrylamide.

The apparatus and procedure of Example II were used to prepare a block copolymer starting with a charge of 10 parts of the prepolymer of Example I, 37.5 parts of diallyldimethylammonium chloride, 2.5 parts of acrylamide, 0.15 part of t-butyl hydroperoxide (70% aqueous solution), 35 parts of water, and 0.1 part of sodium formaldehyde sulfoxylate. The polymerization was carried out at a temperature of 65° C. for 6 hours. The polymer obtained had an intrinsic viscosity in 1 N potassium chloride solution of 0.46 and a chloride content of 13.9%.

Example XX

This example shows the preparation of a block copolymer of a poly(ethylene oxide-propylene oxide) bis(mercaptopropionate) and diallyldimethylammonium chloride.

A poly(ethylene oxide-propylene oxide) bis(mercaptopropionate) was prepared by the procedure described in Example I starting with an A-B-A type block copolymer of ethylene oxide and propylene oxide, wherein the B moiety of the block copolymer consisted of about 36 propylene oxide units and the A moieties consisted of about 27 ethylene oxide units, and mercaptopropionic acid. The apparatus and procedure of Example II were then used to prepare a block copolymer starting with a charge of 6.3 parts of the prepolymer prepared above, 25 parts of diallyldimethylammonium chloride, 0.19 parts of t-butylhydroperoxide (70% aqueous solution), 27 parts of water, and 0.13 parts of sodium formaldehyde sulfoxylate. The polymerization was carried out at a temperature of 60° C. for 6 hours. The polymer obtained had an intrinsic viscosity of 0.22 in 1 M potassium chloride solution and a chloride content of 15.9%.

Example XXI

This example shows the preparation of a block copolymer of a poly(ethylene oxide-propylene oxide) bis(mercaptopropionate) and methyl-4-vinylpyridinium chloride.

The apparatus and procedure of Example III were used to prepare a block copolymer starting with a charge of 6.3 parts of the prepolymer of Example XX, 25 parts of methyl-4-vinylpyridinium chloride, 0.06 parts of ammonium persulfate, and 17 parts of water. The polymerization was carried out at a temperature of 65° C. for 6 hours. The polymer obtained had a chloride content of 15.6%.

Example XXII

This example shows the preparation of a block copolymer of a methoxypolyethylene glycol mercaptopropionate and diallyldimethylammonium chloride.

A methoxypolyethylene glycol mercaptopropionate was prepared by the procedure described in Example I starting with a methoxypolyethylene glycol and mercaptopropionic acid. The apparatus and procedure of Example II were then used to prepare a block copolymer starting with a charge of 6.5 parts of the prepolymer prepared above, 25 parts of diallyldimethylammonium chloride, 0.04 part of t-butyl hydroperoxide (70% aqueous solution), 27 parts of water, and 0.03 part of sodium formaldehyde sulfoxylate. The polymerization was carried out at a temperature of 65° C. for 6 hours. The polymer obtained had an intrinsic viscosity in 1 N potassium chloride solution of 0.13 and a chloride content of 16.8%.

Example XXIII

This example shows the preparation of a block copolymer of a polyethylene glycol bis(mercaptopropionate) and methacrylamidopropyltrimethyl ammonium chloride.

The apparatus and procedure of Example III were used to prepare a block copolymer starting with a charge of 1.5 parts of the polyethylene glycol bis(mercaptopropionate) of Example I, 13.6 parts of methacrylamidopropyltrimethylammonium chloride, 0.03 part of ammonium persulfate, and 13 parts of water. The polymerization was carried out at a temperature of 65° C. for 7½ hours. The polymer obtained had an intrinsic viscosity of 0.34 in 1 N potassium chloride solution and a chloride content of 12.8%.

Example XXIV

This example shows the preparation of a block copolymer of a polyethylene glycol bis(mercaptopropionate), diallyldimethylammonium chloride and acrylic acid.

The apparatus and method of Example II were used to prepare a block copolymer starting with a charge of 7.5 parts of the polyethylene glycol bis(mercaptopropionate) of Example I, 25 parts of diallyldimethylammonium chloride, 5 parts of acrylic acid, 0.11 parts of t-butyl hydroperoxide (70% aqueous solution), 17 parts of water, and 0.08 parts of sodium formaldehyde sulfoxylate. The polymerization was carried out at 65° C. for 5 hours. The polymer obtained had an intrinsic viscosity of 0.14 in 1 N potassium chloride solution and a chloride content of 14.7%.

Example XXV

This example shows the preparation of a block copolymer of a polyethylene glycol bis(mercaptopropionate), diallyldimethylammonium chloride, and sodium vinyl sulfonate.

The apparatus and procedure of Example II were used to prepare a block copolymer starting with a charge of 7.5 parts of the prepolymer of Example I, 25 parts of diallyldimethylammonium chloride, parts of sodium vinyl sulfonate, 0.11 parts of t-butylhydroperoxide (70% aqueous solution), 17 parts of water, and 0.08 parts of sodium formaldehyde sulfoxylate. The polymerization was carried out at a temperature of 65° C. for 5 hours. The polymer obtained had an intrinsic viscosity of 0.06 in 1 N potassium chloride solution and a chloride content of 12.9%.

Example XXVI

This example shows the preparation of a block copolymer of a polyethylene glycol bis(mercaptopropionate), diallyldimethylammonium chloride, and methylmethacrylate.

The apparatus and procedure of Example II were used to prepare a block copolymer from a charge of 7.5 parts of the prepolymer of Example I, 25 parts of diallyldimethylammonium chloride, 5 parts of methyl methacrylate, 0.11 parts of t-butyl hydroperoxide (70% aqueous solution), 17 parts of water, and 0.08 parts of sodium formaldehyde sulfoxylate. The polymerization was carried out at a temperature of 65° C. for 5 hours. The polymer obtained had an intrinsic viscosity in 1 N potassium chloride solution of 0.20 and a chloride content of 13.5%.

Example XXVII

This example shows the testing of the electrical conductivity of coatings made from several of the polymers prepared in previous examples.

Several of the polymers prepared in the previous examples were coated and tested by the procedure described in Example II. The results of the electrical resistivity tests for these polymers are tabulated in Table I. The values of resistivity found for papers coated with these polymers are similar to those measured for commercially used electrically conductive coatings.

TABLE I

| Polymer of example number | Coating weight (lbs./ream) | Resistivity at 15% relative humidity (ohms/square) |
|---|---|---|
| III | 2.00 | 5.4×10⁹ |
| VII | 2.00 | 6.4×10⁹ |
| VIII | 2.00 | 4.9×10⁹ |
| IX | 2.00 | 7.0×10⁹ |
| XII | 2.00 | 3.5×10¹⁰ |
| XIV | 2.00 | 3.4×10¹⁰ |
| XV | 2.00 | 2.3×10¹¹ |

In summary, this invention provides novel block copolymers which have particularly useful conductive properties. Variations may be made in materials, proportions, and procedures without departing from the scope of the invention.

What is claimed is:

1. As a composition of matter, a block copolymer chain comprised of alternating first and second types of blocks, said first type of block being formed of a poly(alkylene oxide) residue selected from the group consisting of poly(ethylene oxide) residues, poly(propylene oxide) residues, and residues of block copolymers of ethylene and propylene oxides, and said second type of block being formed of polymerized vinyl monomers, at least 50%, by weight, of said monomers being vinyl quaternary ammonium salts, said blocks being linked end to end through sulfur atoms.

2. The composition of claim 1 wherein the vinyl quaternary ammonium salt monomer is selected from the group consisting of compounds of the general formulas

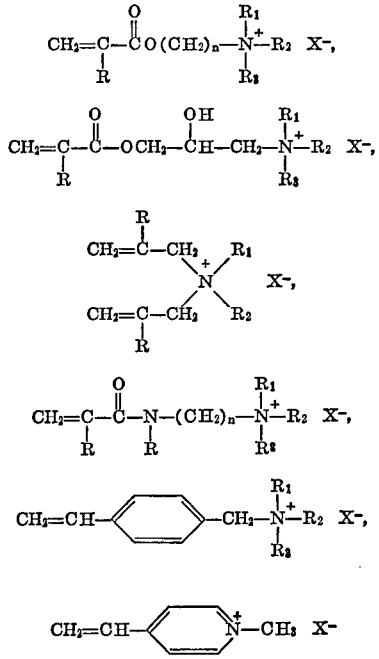

and where $n$ = an integer from 2–6, R is H or $CH_3$, $R_1$, $R_2$, and $R_3$ are radicals selected from the group consisting of alkyl radicals containing 1 to 6 carbon atoms, 2-hydroxyethyl, 2-hydroxypropyl, carboxamidomethyl, carbalkoxymethyl, and 4-chloro-2-butenyl, and $X^-$ is an anion selected from the group consisting of $Cl^-$, $Br^-$, $OSO_3CH_3^-$, and $CH_3CO_2^-$ and $R_1$, $R_2$ and $R_3$ may be the same or different.

3. The composition of claim 1 wherein the poly(alkylene oxide) is a polyethylene glycol.

4. The composition of claim 1 wherein the vinyl quaternary ammonium monomer is methacryloxyethyltrimethylammonium chloride.

5. The composition of claim 1 wherein the vinyl quaternary ammonium monomer is diallyldimethylammonium chloride.

6. The composition of claim 1 wherein the polymerized vinyl monomer block contains in addition to the vinyl quaternary ammonium salts no more than about 50% by weight of at least one other water-soluble polymerized vinyl monomer.

7. The composition of claim 1 wherein the polymerized vinyl monomer block contains no more than about 50% by weight of at least one water-insoluble polymerized vinyl monomer.

References Cited

UNITED STATES PATENTS 2,832,746   4/1958   Jackson _____ 260—874
3,574,791   4/1971   Sherman et al. _____ 260—901

MURRAY TILLMAN, Primary Examiner

J. ZIEGLER, Assistant Examiner

U.S. Cl. X.R.

96—1.5; 117—201; 260—29.2 N, 874, 895, 899